United States Patent [19]

Matsui

[11] 4,162,498
[45] Jul. 24, 1979

[54] VIEWFINDER FOR REFLEX CAMERA
[75] Inventor: Sei Matsui, Chiba, Japan
[73] Assignee: Nippon Kogaku K. K., Tokyo, Japan
[21] Appl. No.: 857,029
[22] Filed: Dec. 2, 1977
[30] Foreign Application Priority Data
Dec. 7, 1976 [JP] Japan ................. 51-163071
[51] Int. Cl.² ........................................... G03B 19/12
[52] U.S. Cl. ............................................... 354/155
[58] Field of Search ............... 354/150–156, 354/202, 199, 200, 201, 223, 224, 225, 219, 53–55

[56] References Cited

U.S. PATENT DOCUMENTS

| | | | |
|---|---|---|---|
| 3,145,634 | 8/1964 | Dicke | 354/152 |
| 3,149,547 | 9/1964 | Jurenz | 354/219 |
| 3,587,383 | 6/1971 | Ikezu | 354/225 |
| 4,047,207 | 9/1977 | Altman et al. | 354/152 X |
| 4,063,261 | 12/1977 | Kuboshima | 354/155 X |
| 4,064,516 | 12/1977 | McLaughlin et al. | 354/219 X |

FOREIGN PATENT DOCUMENTS 677639  8/1952  United Kingdom .................. 354/155

*Primary Examiner*—Donald A. Griffin
*Attorney, Agent, or Firm*—Shapiro and Shapiro

[57] ABSTRACT

A viewfinder for a reflex camera for viewing the image formed through an objective lens comprises a reflecting member for reflecting a light flux from the objective lens in a predetermined direction, a transparent member for passing the reflected light therethrough, and a mat surface located at the exit side of the transparent member and convexly curved toward the entrance side of the transparent member. Thus, the image plane formed by the light flux passed from the objective lens through the transparent member is coincident with the mat surface convexly curved toward the entrance side.

8 Claims, 7 Drawing Figures

SPHERICAL ABERRATION

ASTIGMATISM

COMA

VIEWFINDER FOR REFLEX CAMERA

BACKGROUND OF THE INVENTION

1. Field of the Invention

The invention relates to a viewfinder for reflex cameras, and is more particularly directed to a focusing screen plate within a viewfinder device.

2. Description of the Prior Art

In viewfinders for reflex cameras, it has been the practice to cause a light flux passed from an object through an objective lens to be reflected by a mirror, such as a quick-return mirror or the like, and directly focused on a mat surface provided on that side of a focusing screen plate adjacent to the mirror. Thus, there is only a reflecting surface present between the objective lens through which the light flux from the object passes and the mat surface on which the light flux is focused. However, to meet the growing demand for cameras which are compact and light in weight, consideration has been given to reversing the direction of the focusing screen plate; that is, to provide the mat surface on that side of the focusing screen plate opposite from the mirror so as to permit the light flux to be focused thereon. Such a construction is advantageous in making the camera body compact and light in weight. However, there is the disadvantage that a body corresponding to the thickness of the focusing screen plate intervenes, and therefore, the focusing condition is disturbed. The result is that even if the objective lens is free of aberration, the formed image is out of focus in the marginal portion thereof although the point of focus is coincident with the center portion of the mat surface. This leads to inconvenience in the setting of the composition of the picture; also, there is difficulty in judging the out-of-focus condition of the object image resulting from stop-down.

SUMMARY OF THE INVENTION

It is an object of the invention to provide a viewfinder in which the point of focus is coincident over the entire view field of the mat surface while keeping the construction of the camera compact and light.

According to the invention, a viewfinder for a reflex camera for viewing the image formed through an objective lens comprises a reflecting member for reflecting a light flux from the objective lens in a predetermined direction, a transparent member for passing therethrough the reflected light from the reflecting member, and a mat surface located on the exit side of the transparent member and convexly curved toward the entrance side of the transparent member, whereby the image plane formed by the light flux passed from the objective lens through the transparent member is coincident with the mat surface convexly curved as aforesaid.

The invention will become more fully apparent from the following detailed description thereof taken in conjunction with the accompanying drawings.

DESCRIPTION OF THE PREFERRED EMBODIMENTS

Figure 1:
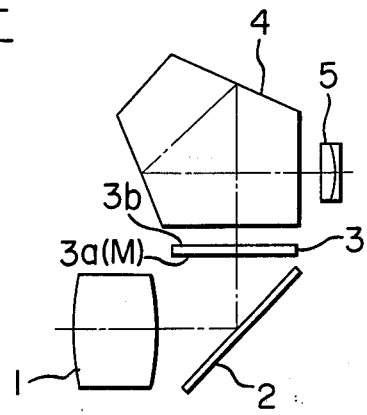
FIG. 1 is a cross-sectional view schematically showing the construction of a viewfinder for a single lens reflex camera according to the prior art.
Figure 2A:
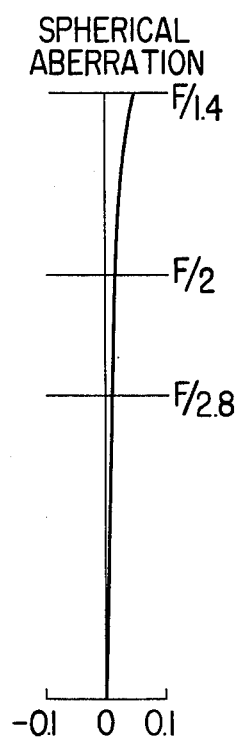
FIGS. 2A, 2B and 2C illustrate an example of various aberrations occurring when a transparent medium comprising parallel flat surfaces is inserted between the mirror and the mat surface.
Figure 2B:
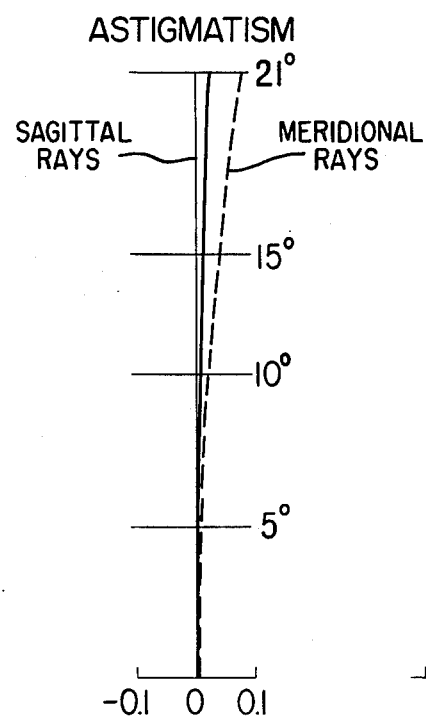
Figure 2C:
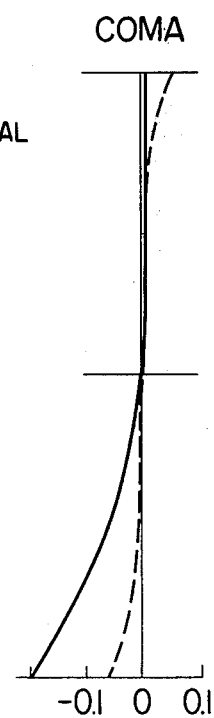

The invention may best be explained with reference to a viewfinder made in accordance with the prior art, FIG. 1, showing the construction of the essential portions of a viewfinder for a single lens reflex camera. The light flux which passes through an objective lens 1 is reflected by a mirror 2 and passes through a focusing screen plate 3 comprising parallel flat surfaces, and into a penta-prism 4 so as to be directed to an eyepiece 5. Here, the state of the image of the object focused on the mat surface provided on the exit surface 3b of the focusing screen plate can be seen by tracing the light rays. As an example of this, FIGS. 2A, 2B and 2C illustrate aberrations occurring in a case where the thickness of the focusing screen plate is 2 mm, the refractive index of the transparent medium forming the focusing screen plate is 1.49 and the objective lens 1 is an aberration-free lens for single lens reflex 35 mm camera having a focal length of 50 mm, a half-angle of view 21° and a relative aperture of 1:1.4. FIG. 2A illustrates spherical aberration, FIG. 2B illustrates astigmatism and FIG. 2C illustrates coma in the meridional direction for a light flux of maximum angle of view, this figure also illustrating lateral spherical aberration by the dotted line. As seen from these aberration graphs, the image plane in the marginal portion thereof is displaced in the positive direction, and coma is very evident in this portion. The image plane becomes a convexly curved plane toward the entrance side. It has been found that these tendencies become greater with increase in the thickness and refractive index of the focusing screen plate. The focusing condition in the marginal portion of the mat surface is further aggravated.

In a construction having a transparent medium intervening between the mirror and the mat surface, the present invention makes the mat surface itself into a convexly curved surface toward the entrance side. The shape of this curved surface corresponds to the curvature of the aforementioned image plane and is determined so as to provide the best focusing condition. Actually, this curved surface may most easily be formed as a spherical surface having a predetermined radius of curvature, and an appropriate curvature of radius should desirably be selected with the characteristics of various interchangeable lenses taken into account.

Figure 3:
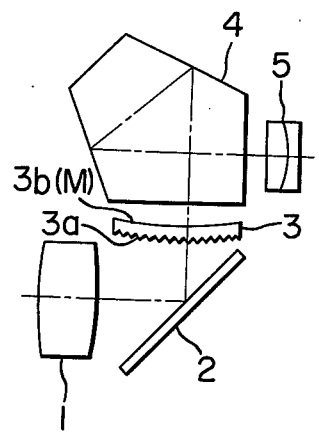
FIGS. 3, 4 and 5 are cross-sectional views showing preferred embodiments of the present invention.

Preferred embodiments of the present invention will hereinafter be described. In FIG. 3, the exit side surface 3b of a focusing screen plate 3 provides a mat surface M which is convexly curved toward the entrance side. The entrance side surface 3a of the focusing screen plate 3 is formed with Fresnel grooves and thus, the focusing screen plate 3 also serves as a Fresnel lens. With such construction, the light flux from the objective lens 1 is condensed before it reaches the mat surface, so that the size of the mat surface can be made smaller, thereby enabling a further reduction in size of the camera body.

Figure 4:
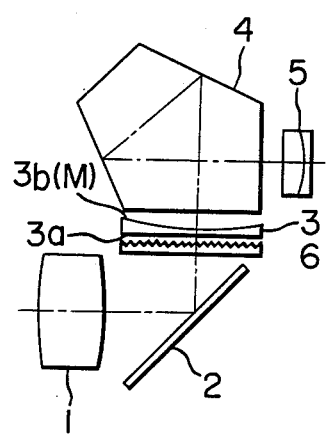

FIG. 4 shows a construction similar to the first embodiment of FIG. 3 in that the exit side surface 3b of the focusing screen plate 3 provides the mat surface M, but differs in that a Fresnel plate 6 is inserted between the focusing screen plate 3 and the mirror 2. According to this construction, the light flux from the objective lens can be condensed at a location nearer to the objective lens, and this means a higher efficiency of condensation and the reduction in size of the mat surface.

Figure 5:
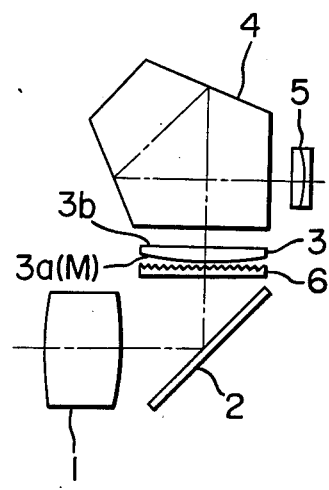

The embodiment of FIG. 5 is similar to the embodiment of FIG. 4 in that a Fresnel plate 6 is inserted, but differs in that the mat surface M is provided on the entrance side of the focusing screen plate 3. In this construction, the mat surface M faces downwardly so that dust or other foreign particles are less likely to be deposited thereon. Such arrangement is particularly advantageous for cameras in which the viewfinder is interchangeable.

Thus, according to the present invention, a viewfinder for reflex cameras is provided which is extremely compact and yet enables the point of focus to be sufficiently coincident over the entire area of the mat surface.

In accordance with the invention, the mat surface itself is curved in compliance with the curvature of the image plane formed by the light flux after passing through the transparent body. However, the mat surface may be provided at the flat exit side surface 3b of the focusing screen plate 3 as shown in FIG. 5, and the entrance side surface 3a may be made convexly curved toward the entrance side, thereby correcting the image plane so as to be flat. In such case, however, the image plane can be somewhat corrected but the curved surface aggravates the other aberrations. On the other hand, the objective lens 1 is usually interchangeable and each objective lens has its own aberrations, and it is therefore desirable that the curvature radius of the mat surface be determined with the average aberration of the entire interchangeable lens taken into account.

It is also desirable that the focusing screen plate 3 as the transparent medium and the Fresnel plate 6 be made of plastic material as has heretofore been done, and this leads to ease of manufacture of the mat surface which is light in weight and curved. In FIGS. 4 and 5, the Fresnel grooves of the Fresnel plate 6 are located on the exit side of this plate. It is within the scope of the invention to provide such grooves on the entrance side of the Fresnel plate.

While several preferred forms of the invention have been illustrated and described, various modifications and changes may be made without departing from the spirit and scope of the invention as sought to be defined in the claims.

I claim:
1. A viewfinder for reflex cameras for viewing the image formed through an objective lens comprising a reflecting member for reflecting a light flux from the objective lens in a predetermined direction, a transparent member for passing therethrough the reflected light from said reflecting member, and a mat surface located on the exit side of said transparent member and convexly curved toward the entrance side of said transparent member, whereby the image plane formed by the light flux passed from said objective lens through said transparent member is coincident with the mat surface convexly curved toward said entrance side.

2. A view finder as set forth in claim 1, wherein said mat surface is the exit side surface of said transparent member.

3. A viewfinder as set forth in claim 2, wherein the entrance side surface of said transparent member has a converging function.

4. A viewfinder as set forth in claim 3, wherein the entrance side surface of said transparent member is a surface having a converging function similar to a Fresnel lens.

5. A viewfinder as set forth in claim 4, wherein said mat surface is a substantially spherical surface.

6. A viewfinder as set forth in claim 1, further comprising another transparent member disposed on the exit side of said first-named transparent member, and wherein said mat surface is one of the surfaces of the entrance side surface and the exit side surface of said another transparent member.

7. A viewfinder as set forth in claim 6, wherein said first-named transparent member is a Fresnel lens.

8. A viewfinder as set forth in claim 7, wherein said mat surface is a substantially spherical surface.

* * * * *